April 21, 1970 W. HAUER 3,508,002

TELEPHONE LINE TRANSMISSION DATA SYSTEM

Filed May 13, 1966 7 Sheets-Sheet 1

INVENTOR.
WERNER HAUER
BY Charles L. Johnson Jr.
ATTORNEY

TELEPHONE LINE TRANSMISSION DATA SYSTEM

Filed May 13, 1966 7 Sheets-Sheet 2

INVENTOR.
WERNER HAUER
BY Charles T. Johnson, Jr.
ATTORNEY

INVENTOR.
WERNER HAUER
BY Charles L. Johnson Jr.
ATTORNEY

INVENTOR.
WERNER HAUER
BY Charles L. Johnson Jr.
ATTORNEY

TELEPHONE LINE TRANSMISSION DATA SYSTEM

Filed May 13, 1966 7 Sheets-Sheet 5

INVENTOR.
WERNER HAUER
BY Charles L. Johnson Jr.
ATTORNEY

TELEPHONE LINE TRANSMISSION DATA SYSTEM

Filed May 13, 1966 7 Sheets-Sheet 6

INVENTOR.
WERNER HAUER
BY Charles S. Johnson Jr.
ATTORNEY

Fig. 11a (TEN PULSE VIDEO ELEMENTS)
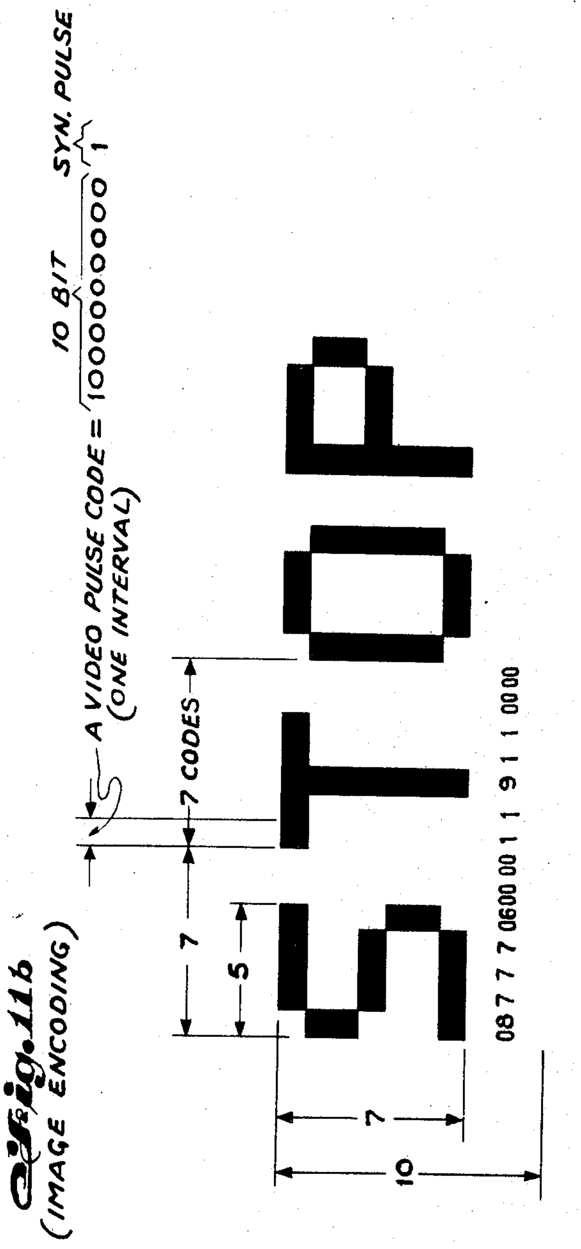
Fig. 11b (IMAGE ENCODING)
INVENTOR
WERNER HAUER
BY
ATTORNEY

United States Patent Office 3,508,002

Patented Apr. 21, 1970

3,508,002

TELEPHONE LINE TRANSMISSION DATA SYSTEM

Werner Hauer, Nutley, N.J., assignor to International Telephone and Telegraph Corporation, Nutley, N.J., a corporation of Maryland Filed May 13, 1966, Ser. No. 550,038
Int. Cl. H04m *11/00*
U.S. Cl. 179—2 17 Claims

ABSTRACT OF THE DISCLOSURE

The data system according to the disclosure defines a transceiver-recorder for interrogating a computer center by a group of audio signals, and for receiving return audio signals which control a ten channel light flash recorder. This system allows direct communication with the computer center through telephone connections. The transceiver-recorder located at the receiving station is a battery powered portable unit utilizing a typewriter type keyboard for the data input and commercial self processing film for recording. The transceiver is connected to the telephone trhough a cradle for the handset.

This invention relates to a data system, and more particularly to a data acquisition system for time shared computer services utilizing a data transceiver-recorder on regular telephone lines and subscribers' sets.

A number of systems are employed in time shared computer services at present. One type in use is a Teletype system which at the computer center transmits a code signal to a receiver, the receiver being an impact printer. Another type of system employed is a facsimile system having a binary video converter at the computer center and a receiver with a facsimile recorder located at the receiving end. The most recent development in the time-shared computer service field employs a code transmitter at the computer centre, and a character generator located at the receiving station to change the signals and record the information on a multichannel stylus recorder.

The data system according to the present invention employs a binary video converter at the computer center, and a commutator located at the receiving station which controls a ten channel light recorder. This system allows direct communication with a computer center on a regional, long distance, or global connection. The transceiver-recorder located at the receiving station is a battery powered portable unit utilizing a typewriter keyboard for the data input, and commercial film for recording. The transceiver is connected to the telephone set through a cradle for the handset. The economies involved in this data system are readily appreciated when compared to the cost in maintenance and installation of Teletype and facsimile equipment.

Therefore, an object of this invention is to provide a system which utilizes a portable battery powered data transceiver-recorder.

Another object of this invention is to provide a data acquisition system which can be used in connection with existing telephone lines and subscribers' sets.

The further object of this invention is to provide a hard copy of the received information on commercial photo-recording material.

Still another object of this invention is to provide a system in which the recording mechanism has a slow mechanical sweep.

And another object of this invention is to provide a system in which the receiving unit produces a dual frame recording without flyback and synchronization is controlled by the sending station.

A still further object of this invention is to provide a system in which the recorder is a multichannel light recorder.

Yet another object of this invention is to provide a data acquisition system for time-shared computer services which is physically smaller and economically cheaper than present small capacity data acquisition systems.

A feature of this invention is that the data system is a system in which the standard eight level binary output information of the computer is converted character by character, first into a seven-bit code and then into seven ten-bit video elements for conversion into an audio pulse train, suited to control a multitrack recording head in several successive recordings and that by electronically commutating the transmitted pulse train to the ten individual pulse tracks of the multi-track recording head of the character head matrix, the line sweep scans at a reduced rate, permitting the use of mechanical means for planar recording on photographic film.

The above mentioned and other features and objects of this invention will become more apparent by reference to the following description taken in conjunction with the accompanying drawings, in which.

Figure 10A:
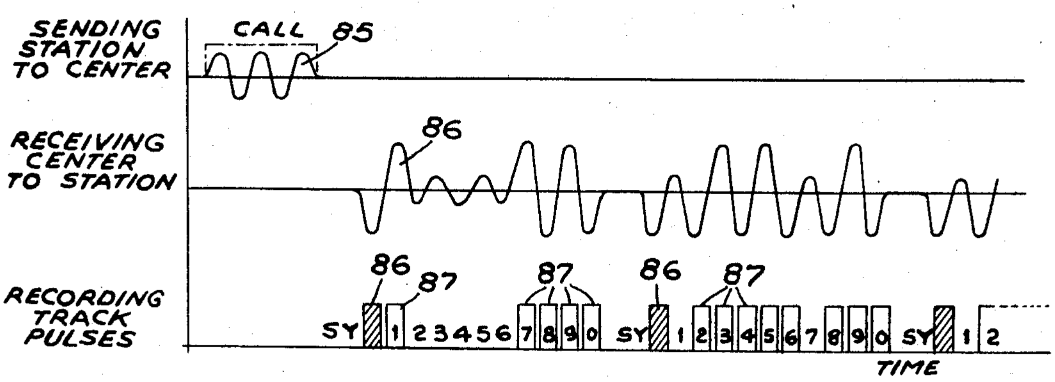
Figures 9, 10B:
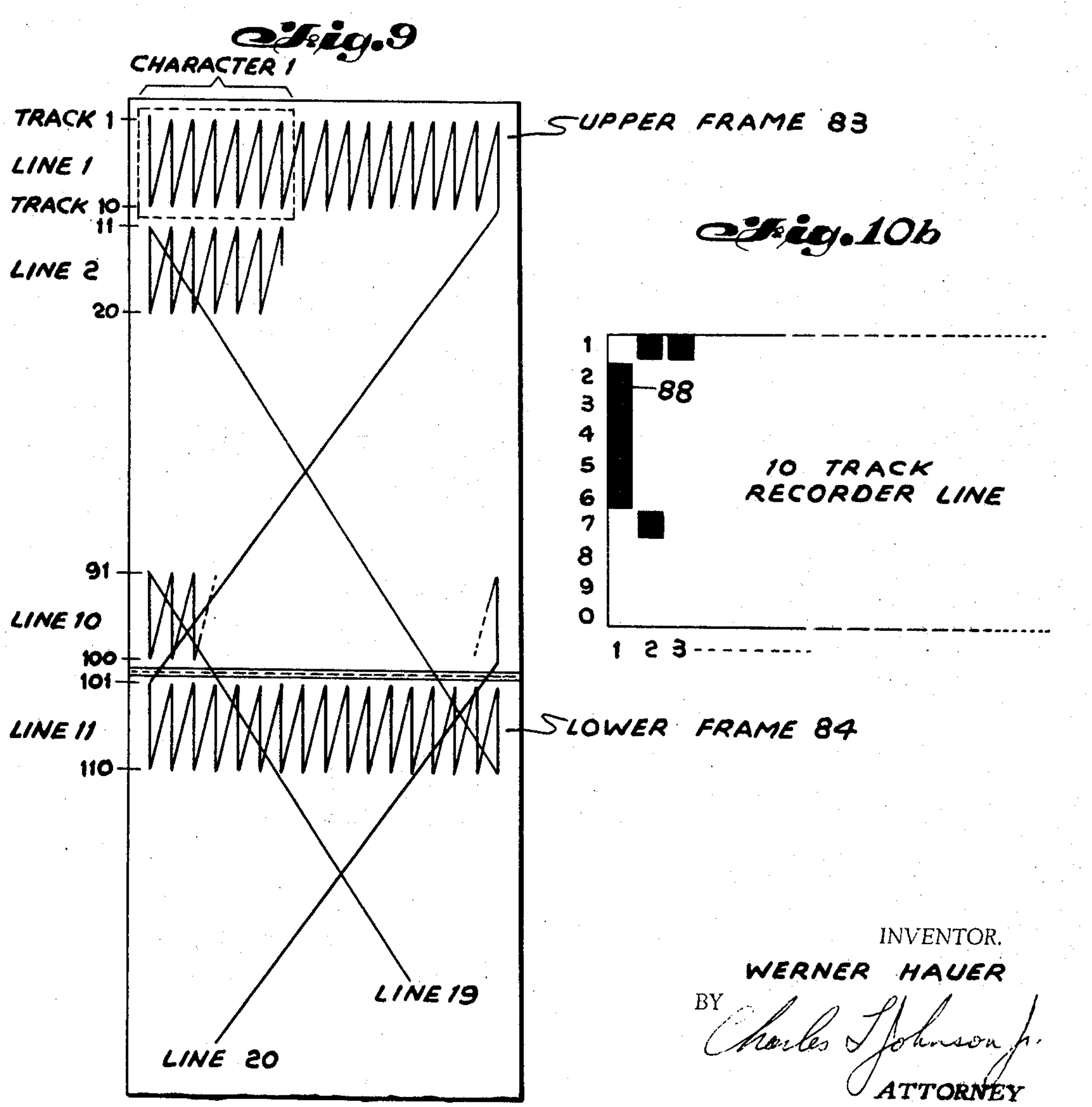
FIGURE 9 is a representation of the write pattern according to the recorder drive.

FIGURE 10*a* is a schematic representation of the signals according to the invention;

FIGURE 10*b* is the recording pattern according to the pulse track of FIGURE 9*a*;

FIGURE 11*a* illustrates an example of ten pulse video elements; and

FIGURE 11*b* shows an example of a character matrix which can be formed using the video elements of FIGURE 11*a*.

This system is an acquisition system for time-shared computer services or data message services in which the transmitter is a portable audio code generator connected to the telephone set by a miniature speaker in a cradle for the handset. A typewriter keyboard is used to set the code recordings in accordance with the characters. The transmitter is equipped with an optional auto addressor sending the address and the pass number automatically. The number of selected programs and the values of the variables are keyed. The signal frequency and code comply with FCCI recommendations. Extra keys for cancellation and acknowledgment are incorporated in the keyboard. In the computer center the customer has a stored program, and the auto addressor can be used to set the program automatically.

This data system employs a portable recorder which is a data recorder for computer print outs in digitized or graphic form. It records the computer information, transmitted over a telephone line, at a carrier frequency which may be 2.4 kilocycles. The recording medium is a photographic paper, packaged and processed similar to the well-known Polaroid 4 by 5 film pack, or any other instant photo-recorder medium.

The information is transmitted element by element and line by line each line having 10 tracts. The page is split in an upper half frame and a lower half frame. The recording alternates between the two halves. All characters are formed by a seven by five grid. The print matrix for each character is 10 by 7 lines, providing a spacing of three lines for the vertical and two lines spacing for the horizontal. For the transmission of drawings all vertical and horizontals are used for the image mosaic. The encoding of the print out characters is sequential and can be handled by a buffer of 640 digit capacity. A library is necessary to convert the alpha-numeric print outs to a video element code. This process is a logic operation. It converts electrical print outs signal directly to a video signal to the telephone lines, no paper copy is required. The recorder is an electromechanical device equipped with two ten track light recording heads. One for the upper half of the page, and the second for the lower half of the page. The two recording heads are in opposite positions, while the upper recording head records, the lower recording head moves in fly back, so that it is in a recording position when the upper recording head is at the end of its recording sweep. At this moment the video signal is switched from the upper to the lower head and this head starts recording.

Facing the recorder head is a Polaroid type film, the 10 tracts of each recorder head sequentially exposes the emulsion. This permits reducing the sweep speed of a tenth of a single track line sweep and permits a low capacity buffer for video conversion without paper copy. During the reciprocating movement of the recorder head a continuous forward motion is applied to the stage. Forward motion and sweep are matched to expose a complete image. After the complete exposure of the film, a signal calls for film replacement. The film must be removed and can be automatically processed within 10 seconds, the received copy with white characters on black background. A converter can be inserted to change the copy to a black character on a white background.

Figure 1:
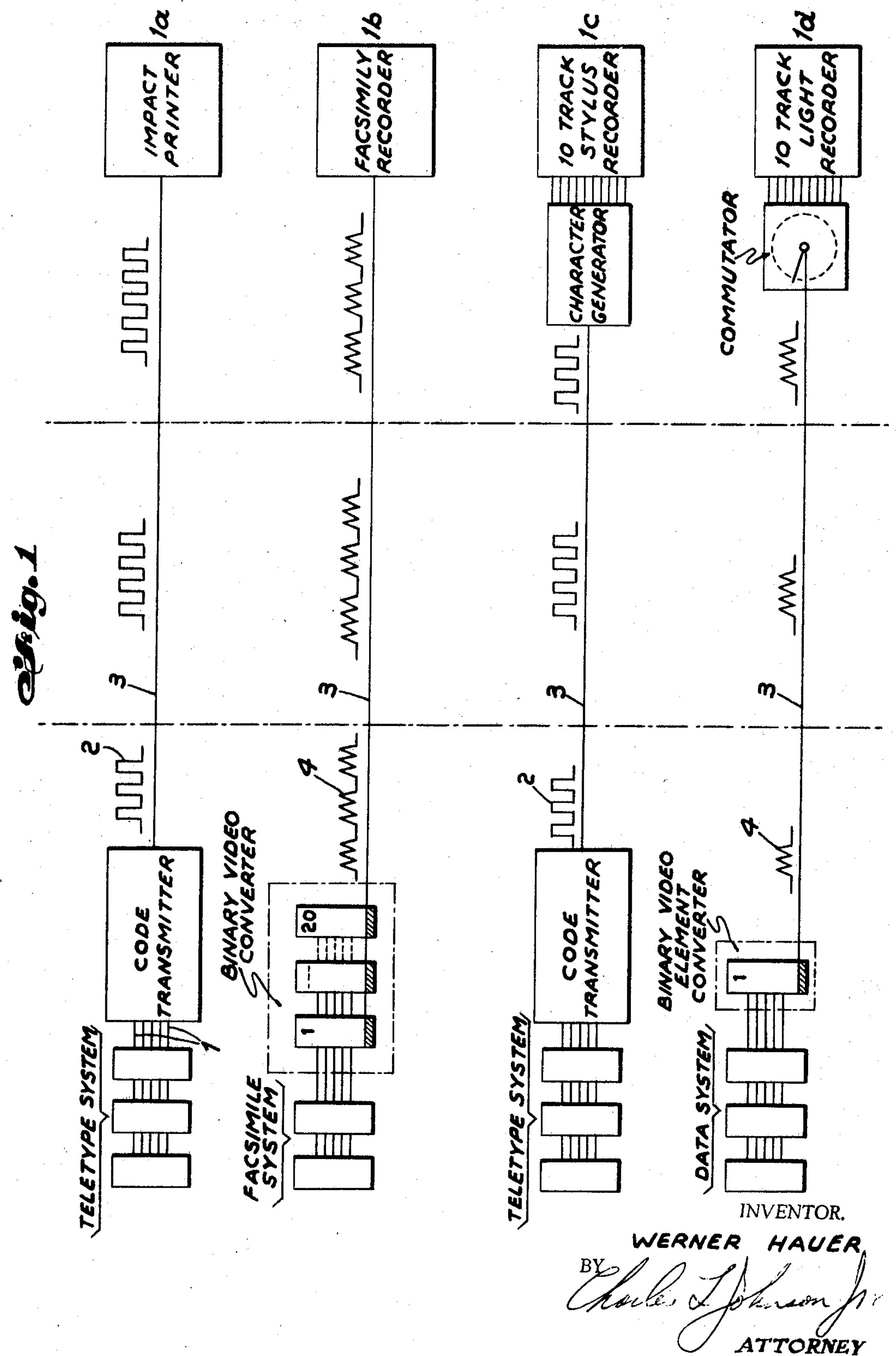
FIGURE 1 is a comparative diagram useful in describing the new features of this system.

Referring now to the comparative diagram, FIGURE 1*a* illustrates a Teletype System which converts a five plus three-bit parallel input 1 to a sequential code 2 suitable for transmission over telephone lines 3. This sequential code is then fed to an impact printer for alpha-numeric copy recording. In the facsimile system in FIGURE 1*b*, a binary video converter is employed. It must have the capability to store and process twenty characters for a one-print line scan for alpha-numeric and graphical recording. The binary video converter emits a video pulse train 4 suitable for transmission over telephone lines 3 to a line-by-line facsimile recorder. The Teletype system shown in FIGURE 1*c* is similar to the transmission method of FIGURE 1*a* except, the impact printer is replaced by a character generator in a 10-channel stylus recorder with alpha-numeric recording capabilities.

The data system according to the invention is illustrated in FIGURE 1*d*. This system as distinguished from facsimile system of FIGURE 1*b*, uses a bianry to video element converter at the computer center, but processes character by character the print out of the computer, whereas the fascimile system must store and process twenty characters. Also, the data system transmits a video pulse train 4 which is received by a commutator for distribution of the received signals to the 10-track light recorder. The system has alpha-numeric and graphical recording capabilities.

Figure 2:
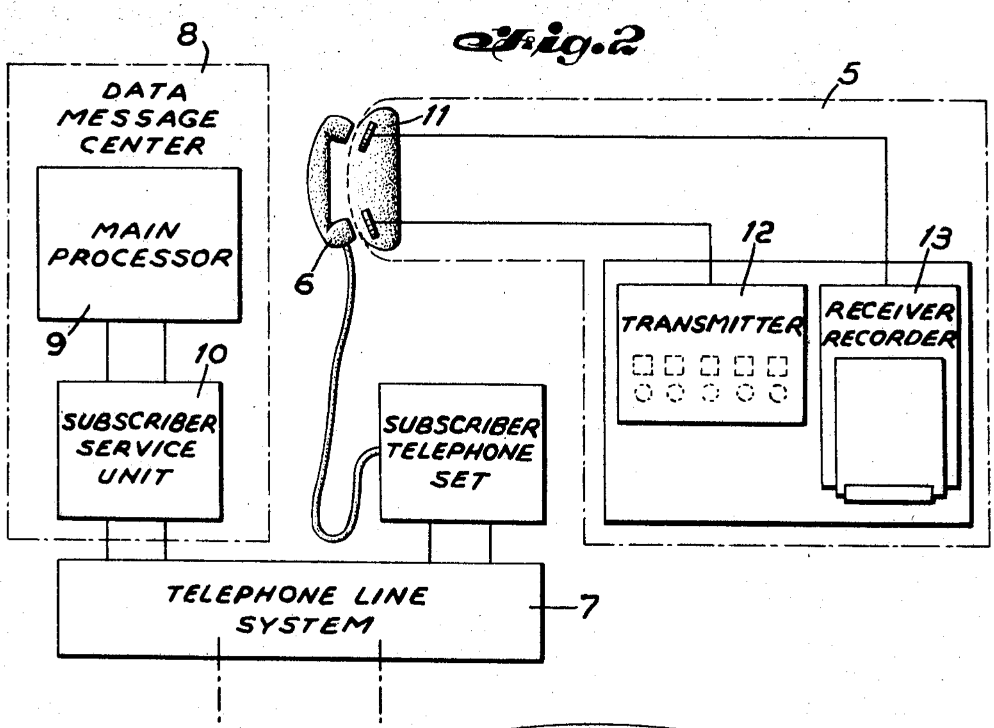
FIGURE 2 is a diagram of a data system according to the invention.

The block diagram of the teledata system according to the invention is shown in FIGURE 2, where the transceiver-recorder 5 coupled to a subscriber telephone set 6 for use in conjunction with standard telephone lines systems 7. The computer center 8 incorporates a main processor 9 and a subscriber service unit 10 which is also coupled to telephone line system 7. The transceiver-recorder 5, is a portable and battery powered unit which consists of a cradle 11 for the telephone handset 6, a transmitter 12 which transmits an audio signal representing the digits of the code to be introduced into the telephone 6, and a receiver-recorder 13 which receives the encoded signal from the computer center to convert and record it.

Figure 3:
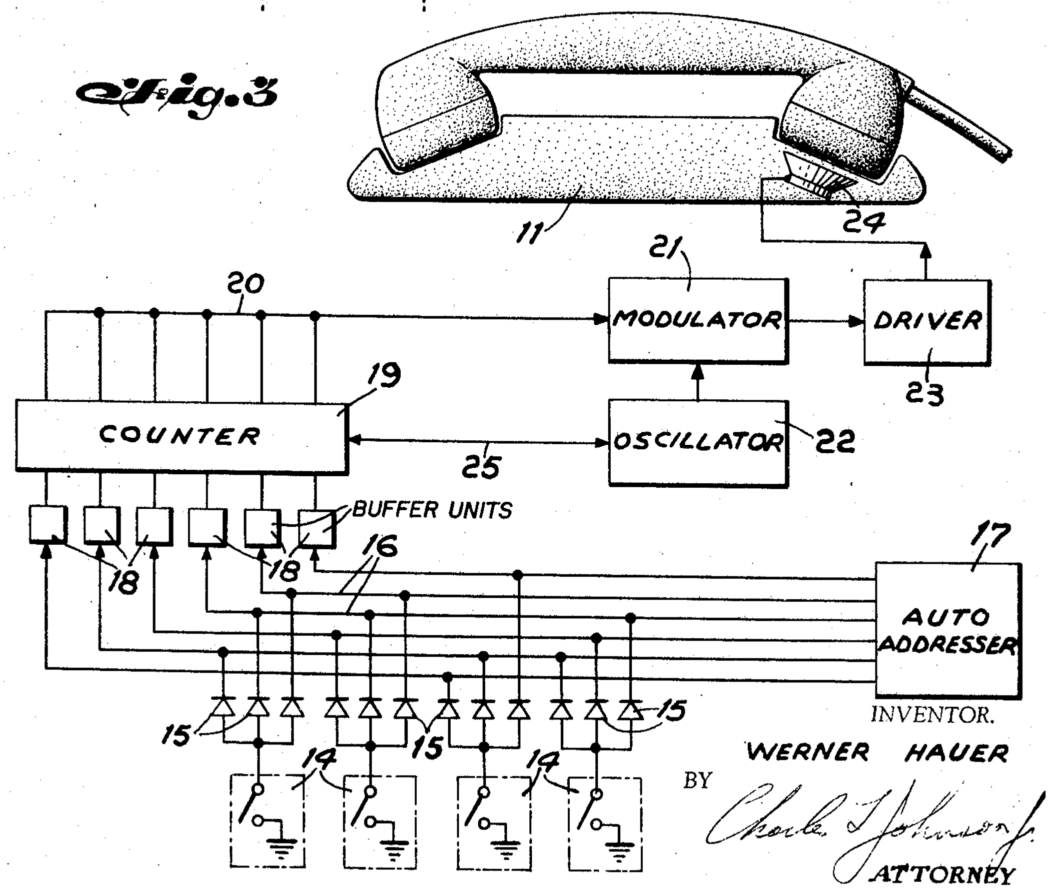
FIGURE 3 is a schematic diagram of the transmitter used with the transceiver-recorder of FIGURE 2.

A schematic diagram of the transmitter used with the transceiver-recorder of FIGURE 2 is shown in FIGURE 3. The transmitter has keys 14 which are numbered 1 through 0. In accordance with the binary value of the numerical diodes 15 the keys are attached to the binary leads 16 and attached to the optional auto addressor system 17. An operated key grounds the associated binary leads 16 by the diodes 15, and energizes the buffer units 18 associated with the particular binary leads. The energization of the buffer unit 18 starts a ring counter 19 and oscillator 22 operating. The oscillator 22 feeds a driver 23 via an amplifying modulator 21. The driver feeds the signal to a speaker 24 located in the cradle 11. The oscillator 22 also functions as the clock of the ring counter via lead 25. As the ring counter goes "on" it opens the path from the buffer unit to a common conductor 20 which is connected to the gain control GC of the modulator 21 in the audio section of the transmitter. As the counter 19 proceeds the gain of the modulator 21 will be monitored by the bias of the excited or unexcited units 18. In this manner an amplitude modulation of an audio signal is achieved.

When a key 14, for example the left-most key, is pressed, a signal is placed on lines 2, 4, 6 (of lines 16 counting from the bottom line to the top line) and the ring counter 19 through connects the lines via the buffer units so that all these input signals can be coupled, in sequence during its counting operation one through six. In this example, since a potential is not placed on the bottom line, no potential is coupled to line 20 during the count one, but since there is a potential on line 2, it will be coupled to line 20 and the gain control of modulator 21. No potential will result from line 3 and no gain for modulator 21. However, as a result of a potential placed on lines 4 and 5, a gain of modulator 21 will be exhibited during the counts four and five of counter 19, and no gain resulting the top line. The potential coupled through the counter during its sequential count either increases or leaves constant the modulation bias of modulator 21. The modulation of the oscillator occurs according to which particular key 14 is pressed.

Figures 4, 6:
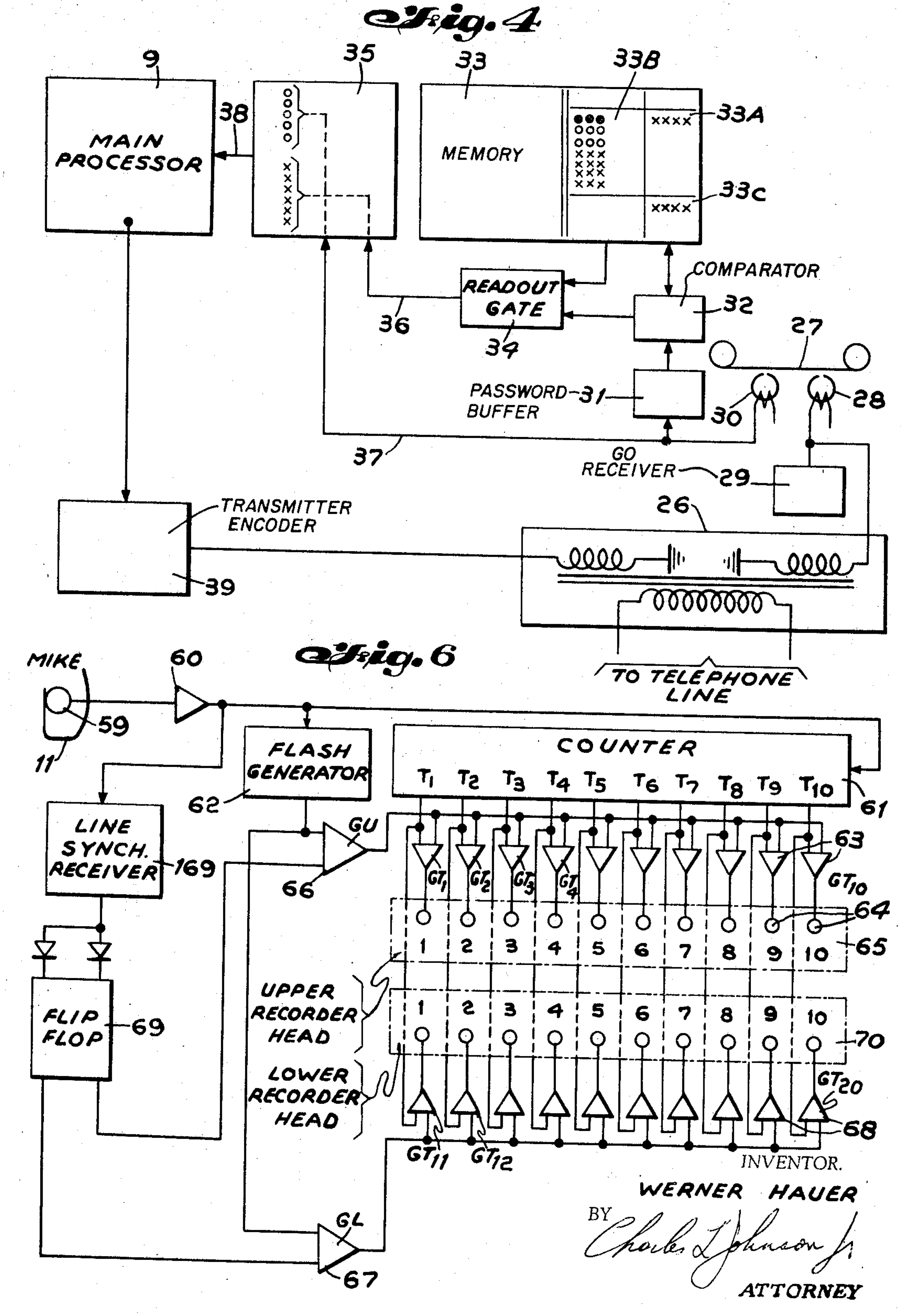
FIGURE 4 is a schematic diagram of the subscriber service unit of FIG. 2.
FIGURE 6 is a schematic representation of the receiver-recorder in FIG. 2.

The subscriber service unit of FIGURE 2 is shown in FIGURE 4, where the signals received over the telephone lines through transformer 26 is recorded on magnetic tape 27 by recorder head 28. A GO receiver 29 is on constant stand-by and as soon as GO signal from the transceiver-recorder arrives magnetic tape 27 will rewind. The play back head 30 will read the pass number off magnetic tape 27 and transmit it to the password buffer 31. An automatic process now follows which is used in most computer centers, in which a comparator 32 reads the program memory 33 for pass number 33A. On coincidence, comparator 32 opens readout gate 34 for the program 33B until a following wrong pass number 33C closes gate 34. This program is then transferred to a scratch board memory 35 via line 36. Simultaneously, the variables recorded on magnetic tape 27 are transferred by line 37 to the scratch board memory 35. The scratch board memory having the complete processing data, calls the main processor 9 by line 38 for execution of the computation. After processing, the main processor feeds the out information to transmitter encoder 39, shown in detail in FIGURE 5, for transmitting back over the telephone line.

Figure 5:
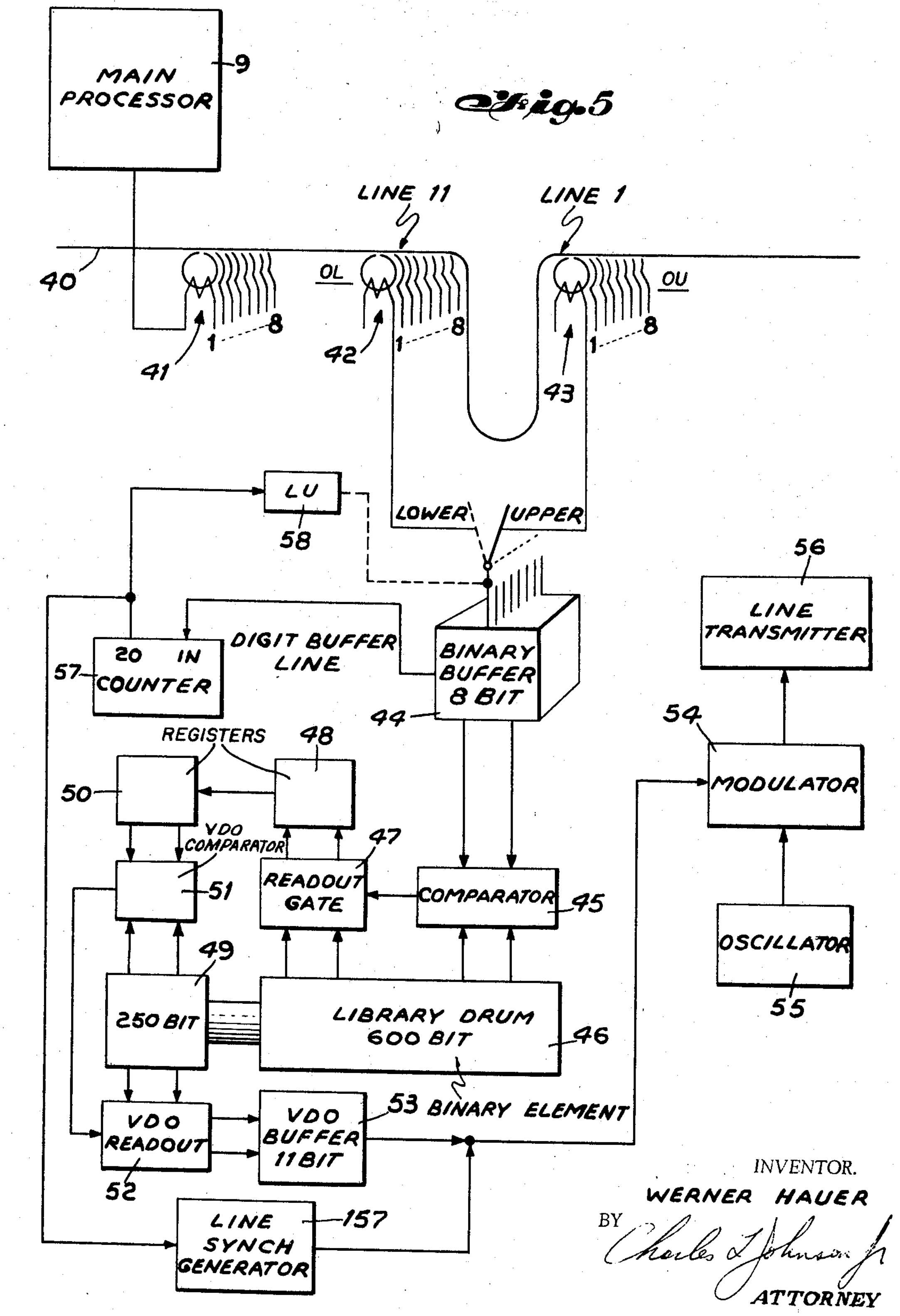
FIGURE 5 is a schematic representation of transmitter encoder for the service unit of FIGURE 4.

Referring now to FIGURE 5, the print out signal of the main processor is recorded on an 8 track magnetic tape 40 with IN head 41 having eight magnetic tracks. Two out heads, OL head 42 and OU head 43 are positioned at the beginning of line 1 and line 101 of the recorded information further described in FIGURE 9. The readout process begins as soon as complete information is recorded. The readout heads OU 43 reads character by character and feeds the eight-bit digit of the standard data interchange code into buffer 44. The eight digit buffer 44 presents the stored binary code to a comparator 45. At the instance of the coincidence with the library drum 46 the comparator opens to readout gate 47 for seven read intervals, feeding seven codes, four bit each, in the line shift register 48. These seven codes are the binary representation of video elements of the seven lines of each character mosaic later transmitted to the transceiver-recorder.

Another section of the drum functions as a video element memory 49. Here the four bit code of the video element is for each line of the mosaic converted to the ten pulse plus one synchronization pulse for the ten elements of each line, steering the modulation of the audio signal for line transmission. The conversion process operates as follows, the four bit code of line register (LO1) 50 is compared by a VDO comparator 51 against the signals of the video element memory 49. In coincidence, the VDO readout 51 opens for one interval and transfers the code of the video element memory 49 to the VDO buffer 53. The VDO buffer 53 sequentially feeds the code to the modulator 54 of the audio group comprising oscillator 55 and line transmitter 56, for transmission over the telephone line to the transceiver-recorder.

The readout process of the first line also controls a counter 57. After reading the 20 characters of line 1 the counter sends a signal to line synch generator 157 and the locking LU switch 58, which connects readout OL head 42 to the binary buffer 44. After reading the 20 characters of line 11 in the lower position, the counter generates another signal resetting LU switch 58 to the upper position OU head 43, the OU head now reads twenty characters of line 2. With every pulse received the line synch generator 157 sends a group of pulses to the receiver-recorded. It should be clearly understood from the foregoing, that when the comparator 45 receives the standard 8-bit data from buffer 44 and the library drum 46 is at a position coupling the same 8-bit data, at that instant of coincidence the comparator opens the readout gate 47 for seven read intervals feeding the seven 4-bit codes into the line shift register 48. For every 8-bit data, the library drum has recorded seven 4-bit codes. Therefore, the drums 8-bits code corresponds to the associated seven 4-bit codes which represent the binary of the 7-video elements. The comparator 45 controls the opening of the readout gate for the required seven read intervals during coincidence. For example:

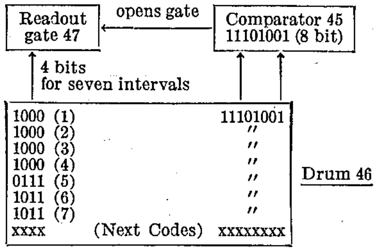

This example shows that when the data bits 11101001 are compared, the gate 47 opens and allows the 4-bits for 7 intervals to be readout, these bits are as shown: 1000, 1000, 1000, 1000, 0111, 1011, and 1011. When another 8-bits code is coupled to comparator 45 another drum position will have associated therewith another seven 4-bit code representative of the seven video elements.

In the same manner the video elements are converted by drum 49, for example:

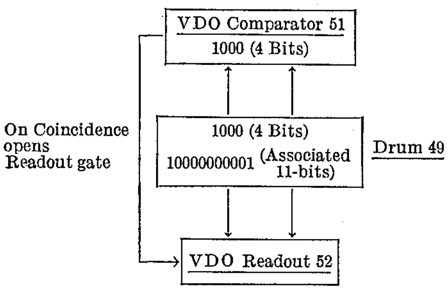

When comparator 51 compares the bits received from register 50 with the bits presented by drum 49, on coincidence, it will open readout 52 so that the 11-bit code recorded on drum 49 may be read out to buffer 53. In the shown example, the 4-bits 1000 on coincidence with the drum, causes the opening of the readout 52 and allows the associated character code 10000000001 to be read out and coupled to unit 53. The codes are the binary representation of the video elements of each character mosaic as illustrated in FIGURES 11A and B. FIGURE 11A illustrates ten pulse video elements which can be used for encoding the character to be transmitted. FIGURE 11B illustrates an example of this character matrix when formed using the video elements of FIGURE 11A. FIGURE 11B also shows how each of the seven codes can be used for a video element pulse code, with one interval corresponding to a 10-bit plus 1-bit synchronization pulse. These codes define the complete matrix which is ten times 7-bit and within which is the seven times 5-bit character matrix. This implementing example shows what may be recorded on the drum and illustrates a manner of coding to satisfy the conditions established by this invention and should be capable of being modified according to the desires of one skilled in the art, but in keeping with the purposes and intent of the broader aspects of this invention.

Restating now the principles of operation, the print out signals from the main processor 9 is recorded onto an 8-track tape 40 with the head 41 and stored. Two heads OL (1 . . . 8) and OU (1 . . . 8) are positioned at the beginning of line 1 and line 11 of the format for the recorded information. The readout process begins as soon as the complete information is recorded. The readout heads OU (1 . . . 8) reads character-by-character and feeds the 8-bit buffer 44. The buffer couples the 8-bit code to the comparator 45. Upon coincidence with the same 8-bit code on the drum 46, the comparator opens gate 47 for seven read intervals, feeding the seven 4-bit codes into the register 48. These seven codes are the binary representation of video elements later transmitted to the Transceiver-Recorder as an audio pulse train.

Another section, drum 49, functions as a video element memory. Here the 4-bit code of the video element is converted to a 10-pulse plus 1-synchronization pulse to steer the modulation of the audio signal for transmission on the telephone line.

The 4-bit code in the line register 50 is compared in comparator 51 against the corresponding codes of the video element memory on drum 49. On coincidence, the readout 52 opens for one interval and transfers the (10+1) code of the video element memory to the buffer 53. The buffer 53 sequentially feeds the code to the modulator 54 of the audio portion for transmission to the Transceiver/Recorder.

The readout process of the first line also controls a counter 57. After 20 characters, the counter 57 sends a signal to the locking LU switch 58. The switch then connects the readout heads OL (1 . . . 8) to the buffer 44. Again after reading 20 characters in the lower position, the counter generates another signal setting the LU Switch in the upper position. The OU heads (1 . . . 8) now read 20 characters of line 10.

FIG. 11*b* shows clearly what appears on the film print out. However, it should be understood that whether these areas are square, round, or other shape, would depend on the shape of the light elements 64. Whether a dark or light area is presented would depend on what was flashed, the character shape which is transmitted, or if a converter was included, flashing the background of the character shape. Conversion of a pulse for dark or light print-out of letters or symbols is well known.

Referring additionally to FIGURE 6, microphone 59 in cradle 11 is connected to amplifier 60. The signal from amplifier 60 is fed to a counter 61, a flash generator 62, and a line synch receiver 169, the low amplitude signals drive the counter only, and the high amplitude signals drive the counter and the flash generator. As the signals arrive, the counter constantly progresses and opens the gates 63 for the light elements 64 of the 10 tract recorder 65, each high amplitude signal energizes the flash generator. The flash is sent to the GU gate 66 and the GL gate 67. The open gate of either 66 or 67 directs the flash to the upper track gates 63 or the lower tract gates 68. The set of gates which are open directs the flash to the associated light elements 64 exposing the emulsion of the photographic film.

After twenty characters, the line synch receiver 169 receives a pulse switching the flip-flop 69 and unopen gate 67 to an open condition, now all the flashes will be directed to the lower recording head 70 by means of gates 68. After 20 more characters the line synch receiver will reset flip-flop 69 to reopen gate 66 and the cycle is repeated.

Figure 7:
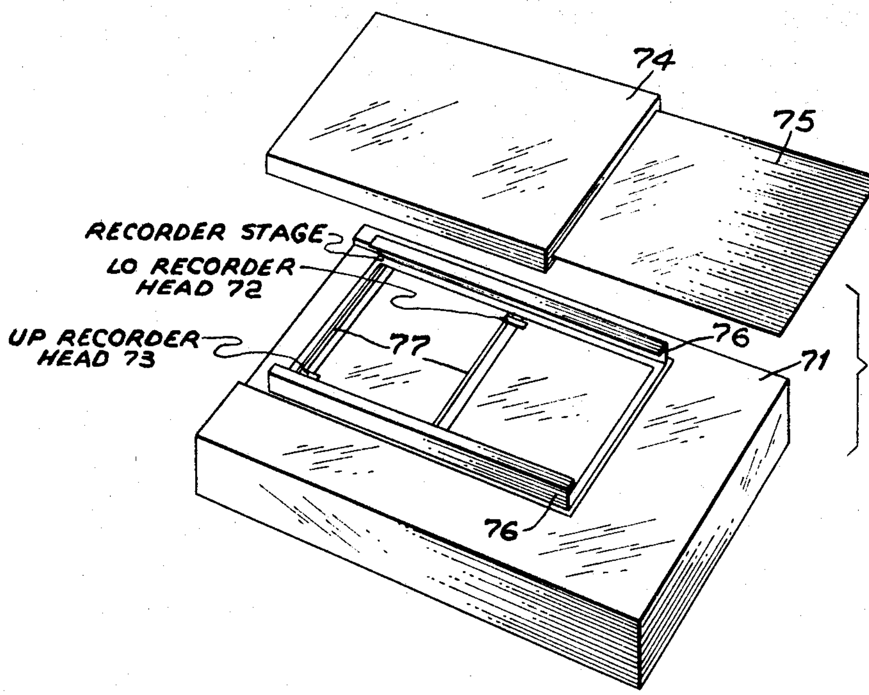
FIGURE 7 is a perspective view of the receiver-recorder in FIGURE 2.

FIGURE 7 shows a perspective view of the receiver-recorder of FIGURE 2, wherein the electro mechanical recorder 71 is equipped with two recording heads, a lower recording head 72 and an upper recording head 73. The upper recording head 73 is for the upper half of the page to be printed and the lower recording head 72 is for the lower half of the page to be printed. As illustrated in the drawing, the two recording heads are in opposite positions, so that while the upper recording heads 73 records as it progresses from left to right, the lower recording head 72 moves in flyback from right to left, so that it is in a recording position when the upper recording head is at the end of its recording sweep. At this moment the video signal is switched from the upper to the lower recording head and the lower head begins recording.

Figure 8:
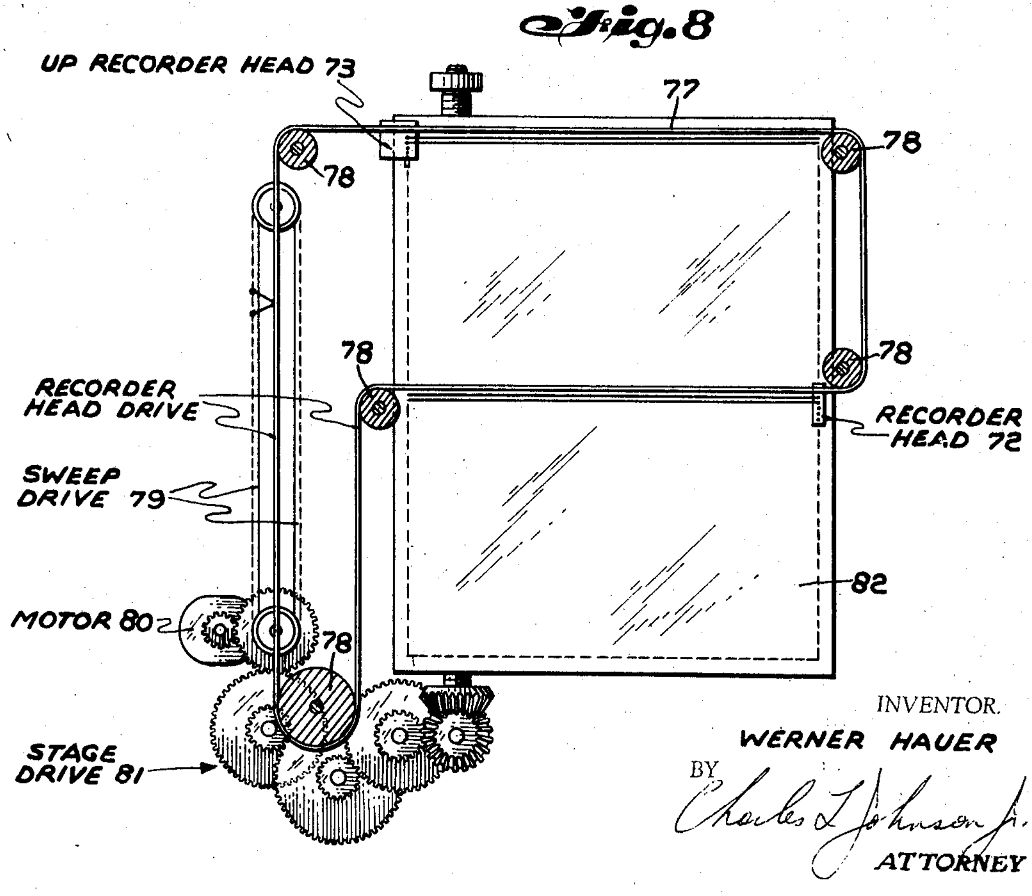
FIGURE 8 is a schematic representation of the recorder drive.

Facing the recording head is a Polaroid type film pack 74 containing individual recording film sheets 75 to be exposed during the sweep of the recording heads. The film pack 74 is contained in the recorder 71 by brackets 76. A sweeping motion of the recording head is accomplished by the sweep drive line 77. A more detailed schematic representation of the recorder drive is shown in FIGURE 8. The sweep drive line 77 rides on pulleys 78, and is driven by sweep drive arrangement 79 which is in a geared motor 80. This arrangement controls the left to right movement of the upper recording head while at the same time causing the lower recording head 72 to flyback right to left. In addition to the recorder head movement from left to right it is necessary for the recorder heads to move from top to bottom. This movement is caused by motor 80 driving recorder head frame 82 up by means of gear arrangement 81.

The write pattern according to the recorder arrangement which alternatively uses the upper and lower recording heads is shown in FIGURE 9. The upper recording head 72 begins at line 1 of upper frame 83, the first 10 light signals expose line 1 tracks 1 through 10 in the first column element. As the upper recorder head 72 traverses left to right each column element is exposed in progression depending on which light of the 10 track recording head is receiving a flash impulse. When the upper recording head 73 is at the end of line 1 the lower recording head

73 is at the beginning of line 11. Now the electronics switches to the lower recorder head. The first 10 signals for line 11 of the lower frame 84 expose column 1 of tracks 1 through 10 in line 11. In this way line 11 will be recorded in the same manner as line 1. At the end of line 11 the upper recording head 73 is in column 1 of line 2, and again the first 10 signals for lines 2 will expose line 2 of upper frame 83 in a continuous manner until line 2 has been completely printed.

Upon completion of line 19, the next to the last pulse train will feed upper frame 83 line 10. Upon completion of line 10, the last pulse train will feed line 20 completing the recording and the exposure of emulsion on the film.

The signal 10A shows the transceiver-recorder signals. For sending of the pass number a frequency 85 is used that does not interfere with touch-tone dialing or the signals for long distance. For receiving, a different frequency is used which is a multiple of 400 cycles so that frequency division permits control of a 400 cycle drive motor. The pulse signal 86 is amplitude modulated. After demodulation, the recording track pulse is in the form of a synchronizing pulse 86 and an information pulse 87. FIGURE 10*b* shows the recording pattern associated with the track pulses of FIGURE 10*a*. In the time slot where a pulse is absent, dark field 88 indicates exposure on the emulsion.

In operation, the user will place the telephone handset into the cradle of the transceiver-recorder and use the auto addressor in the transmitter to contact the data center over the telephone line system. The program users will then key the variables and the program, or the program number and the variables by means of the keyboard on the transmitter. The entire transmission is recorded at the data center on tape, and at the end of transmission, the tape is played back into the program memory for properly interrogating the main processor for the computation or data. The file user will merely identify the wanted file section.

The data from the main processor is fed to a transmitter encoder which converts the binary output of the processor to a video pulse train for transmission over the telephone lines to the recorder.

The information is then printed on photosensitive material by a pair of recording heads. The two heads are in opposite positions, such that when the upper head records, the lower head moves in flyback, so that the page is printed a line at a time alternating between the upper and lower half of the page.

After complete exposure of the photosensitive material a signal calls for the removal and processing of the page. In addition, extra keys are provided on the keyboard for cancellation, acknowledgement, and clearance for next page print out.

While I have described the above principles of my invention in connection with specific apparatus, it is to be clearly understood that this description was made only by way of example and not as a limitation to the scope of my invention as set forth in the objects thereof and in the accompanying claims.

I claim:

1. A data system for data acquisition utilizing telephone lines, comprising:

a data center;

means for converting the binary output information of said data center, character by character into an audio pulse train for transmission over said telephone lines; and means connected to a telephone line receiver for interrogating said data center and for commutating said audio pulse train to energize a plurality of light elements on a recording head for exposing the emulsion of a photographic film medium.

2. A data system according to claim 1 wherein said means for interrogating and commutating is a transceiver-recorder comprising:

a cradle adapted to receive the handset of a telephone, said cradle having a microphone and speaker;

a transmitter connected to the speaker of said cradle; and a receiver-recorder connected to the microphone of said cradle, whereby the transmitter transmits an amplitude modulated audio signal representing an interrogating code into the handset, and said receiver-recorder receives said audio pulse train from said data center through said cradle microphone and commutates said pulse train to the light recording head for recording directly on said medium.

3. Transmitter apparatus according to claim 2 comprising:

a plurality of transmitter keys;

an auto addressor;

means connecting said auto addressor and said keys to a plurality of buffer units;

a counter being connected to said buffer units;

a modulator connected to the output of said counter;

an oscillator, one output of said oscillator being connected to said modulator, and another output of said oscillator being connected to said counter to function as the clock of said counter; and a driver whose input is controlled by said modulator and whose output controls said speaker in said cradle, whereby operation of one of said keys energizes an associated buffer unit which starts said counter in operation, and on compression of said key said oscillator feeds said modulator and driver, such that the output of said counter amplitude modulates said modulator, and an amplitude modulated audio signal is produced at said speaker for transmission over said telephone lines.

4. Apparatus according to claim 3 further including:

means for receiving the said interrogation pulses from said transmitter;

means for recording said interrogation pulses;

means for requesting computation by said data center; and means for converting the binary output of said center into a video pulse train before conversion into an audio pulse train.

5. Recorder apparatus according to claim 2 comprising:

a plurality of recorder heads;

means for linearly sweeping said recorder heads, such that when one head is recording, another head is moving in flyback; and means for advancing said recording medium perpendicular to the sweep of said recorder heads and in synchronism with the sweep of said recorder heads.

6. Apparatus according to claim 5 further including a battery powered drive unit for driving said sweeping and advancing means.

7. Apparatus according to claim 6 wherein said recorder heads each contain a multiplicity of light elements, said light elements to expose a self processing photosensitive medium, such that one recorder head exposes the upper half of the said medium and the other recorder head exposes the lower half of said medium.

8. Apparatus according to claim 7 including:

an amplifier being connected to said microphone for amplifying said pulse train;

means for flashing each of said light elements;

a counter being connected for counting said pulses and for driving said light elements;

gating means for controlling the flashing of each of said light elements and for controlling the upper and lower recording heads; and a line synch receiver arrangement whereby after completion of a line by one of said recording heads, a flip-flop opens the gating means to the other of said recording heads.

9. Apparatus according to claim 4 wherein said means for converting comprises:

means for recording the binary output of said center;

means for selectively reading said recorded output;

a line synch generator;

means for comparing said output character by character with a library drum; and a video element member for converting said binary output to the video pulse train on coincidence of said binary output with said library.

10. Apparatus according to claim 9 wherein said means for selectively reading said recorded output comprises:

an upper reading head;

a lower reading head;

a binary buffer;

means selectively coupling said buffer to the uppet and lower reading heads; and a counter for generating a signal to control said coupling means, such that at the end of a predetermined number of binary output information received by said buffer, said counter generates the required signal to cause the alternate coupling of said buffer.

11. A data system having a transceiver-recorder connected to a telephone line for data acquisition comprising:

a data center;

a transmitter means on said transceiver-recorder for producing an audio pulse train for interrogating said center;

means for converting the output information of said data center character by character into a return audio pulse train for reception over said telephone lines; and means on said transceiver-recorder for receiving said return pulse train and for recording of said return pulse train by a recording head having a plurality of light emitting elements which expose a self processing photographic film.

12. A transceiver-recorder for a data acquisition system using telephone lines comprising:

a cradle adapted to receive the handset of a telephone, said cradle having a microphone and speaker;

a transmitter connected to the speaker of said cradle; and a receiver-recorder connected to the microphone pickup of said cradle, whereby the transmitter portion transmits an audio interrogating signal representing a code into the handset, and the receiver portion receives another audio pulse train through said cradle and commutates said pulse train to the recorder portion for recording by a plurality of light emitting recording heads on a rapid process photographic film.

13. A transceiver-recorder according to claim 12, the transmitter portion comprising:

a plurality of transmitter keys;

an auto addressor;

means connecting said auto addressor and said keys to a plurality of buffer units;

a counter being connected to said buffer units;

a modulator connected to the output of said counter;

an oscillator, one output of said oscillator being connected to said modulator, and another output of said oscillator being connected to said counter to function as the clock of said counter; and a driver whose input is controlled by said modulator and whose output controls said speaker in said cradle, whereby operation of one of said keys energizes an associated buffer unit which starts said counter in operation, and on compression of said key said oscillator feeds said modulator and driver, such that the output of said counter amplitude modulates said modulator to produce an amplitude modulated audio signal for transmission over said telephone lines.

14. A transceiver-recorder according to claim 12, the recorder portion comprising:
- a plurality of light emitting elements on each of said plurality of recording heads;
- means for linearly sweeping said plurality of recording heads such that when one head is recording, another head is moving in flyback; and
- means for advancing said recording medium perpendicular to the sweep of said recorder heads and in synchronism with the sweep of said recorder heads.

15. A transceiver-recorder according to claim 14 further including:
- an amplifier connected to said microphone for amplifying said other audio pulse train;
- means for flashing each of said light emitting elements;
- a counter coupled for counting said pulses and for driving said light elements;
- gating means for controlling the flashing of each of said light elements and for controlling the upper and lower recording heads; and
- a line synch receiver arrangement whereby after completion of a line by one of said recording heads, a flip-flop opens the gating means to the other of said recording heads.

16. A method of data acquisition utilizing a transceiver-recorder connected to a telephone handset of a telephone line comprising the steps of:
- producing an audio pulse train in the transmitter portion of said transceiver-recorder for interrogating a data center;
- receiving a return audio pulse train from said data center;
- flashing a plurality of light emitting elements on a recording heading in accordance with said received pulse train; and
- exposing the emulsion of a photographic film by said flashing of light elements.

17. A method of data acquisition utilizing a transceiver-recorder connected to a telephone line through a telephone handset comprising the steps of:
- producing an interrogating audio pulse train in the transmitter portion of said transceiver-recorder for transmission to a data center;
- receiving a return audio pulse train from said data center in response to said interrogation;
- operating a plurality of light recording heads in flyback;
- flashing a plurality of light emitting elements on each of said heads in accordance with said pulse train; and
- exposing the emulsion of a self processing photographic film by the flashing of said light emitting elements.

References Cited

UNITED STATES PATENTS

| | | | |
|---|---|---|---|
| 2,186,899 | 1/1940 | D'Humy et al. | 179—4 |
| 2,903,517 | 9/1959 | Ridings | 179—4 |
| 3,084,213 | 4/1963 | Lemelson | 179—4 X |
| 3,242,470 | 3/1966 | Hagelbarger et al. | 340—172.5 |
| 3,351,929 | 11/1967 | Wagner | 340—172.5 X |
| 3,376,509 | 4/1968 | Willcox et al. | |
| 3,037,074 | 5/1962 | Foll | 178—6.7 |
| 3,401,396 | 9/1968 | Wolf et al. | 179—2 X |

RALPH D. BLAKESLEE, Primary Examiner

U.S. Cl. X.R.

178—6.7; 340—152, 172.5